United States Patent
Nádas et al.

(10) Patent No.: US 11,695,703 B2
(45) Date of Patent: Jul. 4, 2023

(54) MULTI-TIMESCALE PACKET MARKER

(71) Applicant: Telefonaktiebolaget LM Ericsson (publ), Stockholm (SE)

(72) Inventors: Szilveszter Nádas, Budapest (HU); Sándor Laki, Budapest (HU); Gergo Gombos, Budapest (HU); Ferenc Fejes, Budapest (HU)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 58 days.

(21) Appl. No.: 17/606,579

(22) PCT Filed: Apr. 21, 2020

(86) PCT No.: PCT/IB2020/053758
§ 371 (c)(1),
(2) Date: Oct. 26, 2021

(87) PCT Pub. No.: WO2020/229905
PCT Pub. Date: Nov. 19, 2020

(65) Prior Publication Data
US 2022/0224652 A1 Jul. 14, 2022

Related U.S. Application Data

(60) Provisional application No. 62/847,497, filed on May 14, 2019.

(51) Int. Cl.
*H04L 47/28* (2022.01)
*H04L 43/0888* (2022.01)
*H04L 47/215* (2022.01)

(52) U.S. Cl.
CPC .......... *H04L 47/28* (2013.01); *H04L 43/0888* (2013.01); *H04L 47/215* (2013.01)

(58) Field of Classification Search
None
See application file for complete search history.

(56) References Cited

U.S. PATENT DOCUMENTS

| | | | | |
|---|---|---|---|---|
| 11,019,126 B2* | 5/2021 | Sridhar | ............... | H04L 65/613 |
| 2015/0074285 A1* | 3/2015 | Gahm | ............... | H04L 47/11 |
| | | | | 709/231 |
| 2015/0088965 A1* | 3/2015 | Pakulski | ............... | H04N 21/84 |
| | | | | 709/219 |

(Continued)

FOREIGN PATENT DOCUMENTS

| | | | | |
|---|---|---|---|---|
| WO | 2014189422 A1 | 11/2014 | | |
| WO | 2018086713 A1 | 5/2018 | | |
| WO | WO-2018112657 A1 * | 6/2018 | ............. | H04L 12/66 |
| WO | 2019096370 A1 | 5/2019 | | |

(Continued)

OTHER PUBLICATIONS

Nádas, S. et al., "Multi time-scale fairness for heterogeneous broadband traffic in access-aggregation network", European Workshop on Performance Engineering—International Conference on Analytical and Stochastic Modeling Techniques and Applications, Nov. 27, 2021, pp. 62-78, Springer.

(Continued)

*Primary Examiner* — Anh Vu H Ly
(74) *Attorney, Agent, or Firm* — Coats & Bennett, PLLC

(57) ABSTRACT

A network node (120), such as a packet marking node, efficiently measures the bitrates of incoming packets on a plurality of timescales (TSs). A throughput-value function (TVF) is then graphed to indicate the throughput-packet value relationship for that TVF. Then, starting from the longest TS and moving towards the shortest TS, the packet marking node determines (88) a distance between the TVFs of different TSs at the measured bitrates. To determine the packet marking, the packet marking node selects a random throughput value between 0 and the bitrate measured on the shortest TS. Depending on how the random value relates to the measured bitrates, a TVF, and the distances to add to the random value, is then selected to determine (92) a packet value (PV) with which to mark the packet. The packet marking node then marks (94) the packet according to the determined PV.

20 Claims, 10 Drawing Sheets

(56) References Cited

U.S. PATENT DOCUMENTS

| | | | | |
|---|---|---|---|---|
| 2016/0205164 A1* | 7/2016 | Schmidt | ............... | H04L 65/70 709/219 |
| 2020/0067852 A1* | 2/2020 | Sen | ............... | H04L 65/752 |
| 2021/0288942 A1* | 9/2021 | Preda | ............... | H04L 67/02 |

FOREIGN PATENT DOCUMENTS

| | | | | |
|---|---|---|---|---|
| WO | 2019141380 A1 | | 7/2019 | |
| WO | WO-2019217530 A1 * | | 11/2019 | ......... H04L 47/215 |
| WO | 2020074125 A1 | | 4/2020 | |
| WO | 2020229905 A1 | | 11/2020 | |

OTHER PUBLICATIONS

Nádas, S. et al., "Bandwidth profile for multi-timescale fairness", 2020 IEEE Wireless Communications and Networking Conference (WCNC), May 25, 2020, pp. 1-8, IEEE.

Metro Ethernet Forum, "Ethernet Services Attributes Phase 2", MEF Technical Specification, Version MEF 10.2, Oct. 27, 2009, pp. 1-65, MEF.

Nádas, S. et al., "Per Packet Value: A Practical Concept for Network Resource Sharing", 2016 IEEE Global Communications Conference (GLOBECOM), Dec. 4, 2016, pp. 1-7, IEEE.

Nádas, S. et al., "Multi timescale bandwidth profile and its application for burst-aware fairness", arXiv:1903.08075v1, Mar. 19, 2019, pp. 1-4, arXiv.

Nádas, S. et al., "Towards Core-Stateless Fairness on Multiple Timescales", ANRW '19: Proceedings of the Applied Networking Research Workshop, Jul. 22, 2019, pp. 30-36, Association for Computing Machinery.

Nádas, S. et al., "Towards a Congestion Control-Independent Core-Stateless AQM", ANRW '18: Proceedings of the Applied Networking Research Workshop, Jul. 16, 2018, pp. 84-90, Association for Computing Machinery.

* cited by examiner

MULTI-TIMESCALE PACKET MARKER

RELATED APPLICATIONS

This application claims the benefit of U.S. Provisional Application No. 62/847,497 filed 14 May 2019, the entire disclosure of which being hereby incorporated by reference herein.

TECHNICAL FIELD

The present disclosure relates generally to bandwidth management in communications networks, and more particularly, to systems and methods for resource sharing using per packet marking over multiple timescales.

BACKGROUND

Communications networks, such as radio communications networks, are ubiquitous in today's society. In such networks, certain resources, such as bandwidth, is limited and often shared among users or devices. In most cases, the amount of resources, such the available bandwidth, is controlled. Sometimes, though, a "bottleneck" exists that can negatively impact the resource sharing. In these cases, the "bottleneck" must be managed efficiently. As is known in the art, a "bottleneck" is a location in the network where a single or limited number of components or resources affects the capacity or performance of the network. One way to handle such bottlenecks is by entering a "bottleneck mode" and marking packets.

Generally, when operating in a bottleneck mode, current methods of per-packet marking based bandwidth sharing control depend on the importance of the packets. More specifically, in the bottleneck mode, edge nodes assign a label to each packet indicating the "importance value" of each packet. For example, the packets communicated in response to an emergency call might have a higher priority and be considered more important than packets exchanged during a session where the user merely surfs the Internet. The assigned importance values are used in determining how to share the bandwidth.

Packets are usually associated with "packet flows," or simply "flows." Generally, the importance values that are assigned to the packets of one flow can be different from the importance values assigned to packets in other flows. Similarly, the importance values of packets within the same flow can be different. In times of congestion, for example, this allows a network entity to drop packets having the lowest importance first.

Methods currently exist to control bandwidth sharing among flows even when per flow queuing is not possible. Two such methods are described, for example, in U.S. Pat. No. 9,948,563 entitled, "Transmitting Node, Receiving Node and methods therein," and in the paper entitled "Towards a Congestion Control-Independent Core-Stateless AQM," ANRW '18 Proceedings of the Applied Networking Research Workshop. pp. 84-90. Both methods are based on per-packet marking based bandwidth sharing control, and define algorithms for a single buffer that result in a shared delay among flows.

"Fairness" can also be considered when marking on a per-packet basis. Generally, "fairness" is interpreted as being the equal, or weighted, throughput of data experienced by one or more entities, such as a node or service endpoint, for example, processing a traffic flow or aggregated traffic flows. Such "throughput" is a measure derived from the total packet transmission during a time interval. The length of a time interval is referred to as a "timescale." For so-called "bursty" traffic, the bandwidth that is measured on multiple timescales (e.g. Round Trip Time (RTT), 1s, session duration, etc.) usually results in different values.

Some methods of resource sharing control are based on bandwidth measured either on a short timescale (e.g. RTT) or on a very long timescale (e.g. in the form of a monthly volume cap). The need for fairness on different time scales is illustrated by the example of short bursty flows and long flows sometimes referred to, respectively, as "mice and elephants." Contrary to the fairness methods, in which silent periods are included, the performance of a given session is generally described by the bandwidth experienced during the whole session.

Other methods of resource sharing control utilize token buckets. More particularly, these methods implement multi-timescale profiling by assigning a plurality of token buckets—each of which represents a different timescale—to a same Drop Precedence level. In these methods, packets are marked in accordance with the given drop precedence level of all related buckets containing a predefined number of tokens.

SUMMARY

Embodiments of the present disclosure configure multiple timescales (TSs), as well as a Throughput-Value Function (TVF) for each TS. More particularly, embodiments of the present disclosure efficiently measure the bitrates of incoming packets on all TSs. Then, starting from the longest TS and moving towards the shortest, embodiments of the present disclosure determine a distance between the TVFs of different TSs at the measured bitrates.

Additionally, embodiments of the present disclosure also provide a method for marking packets. To determine the packet marking, the present embodiments select a random throughput value between 0 and the bitrate measured on the shortest TS. Depending on how the random value relates to the measured bitrates, embodiments of the present disclosure select a TVF, as well as the distances to add to the random value, to determine the packet marking.

Additionally, embodiments of the present disclosure re-use the existing per-packet value (PPV) core stateless schedulers in the core of the network, and provide an optimized implementation where bitrate measurement on longer timescales is not updated for each packet arrival.

In one embodiment, a method of managing shared resources using per-packet marking is provided. In this embodiment, the method comprises assigning a plurality of throughput-value function (TVFs) to a plurality of timescales (TSs). Each TVF is assigned to a respective TS, and each TS is associated with one or more valid bitrate regions. The method also calls for determining a plurality of measured bitrates based on the plurality of TSs, determining a random bitrate, and determining one or more distances between the plurality of TVFs. Each distance defines an invalid bitrate region between two TVFs. The method then calls for selecting a TVF based on the random bitrate and the one or more distances between the plurality of TVFs, determining a packet value with which to mark a received packet as a function of the selected TVF, and marking the received packet with the packet value. So marked, the method also calls for outputting the packet marked with the packet value.

In one embodiment, each TVF relates a plurality of packet values to bitrate throughput, and both the packet values and the bitrate throughput are on a logarithmic scale.

In one embodiment, the method further comprises updating the plurality of measured bitrates based on the plurality of TSs.

In one embodiment, the random bitrate is a randomly selected throughput value between 0 and a bitrate measured on a shortest TS.

In one embodiment, the method further comprises selecting a valid bitrate region from the one or more valid bitrate regions.

In such embodiments, the selected TVF is associated with the selected valid bitrate region.

In one embodiment, the method further comprises quantizing the TVFs into a token bucket matrix. In these embodiments, each TVF is quantized into one or more token buckets with each token bucket corresponding to a different maximum number of tokens.

In such embodiments, selecting a TVF based on the random bitrate and the one or more distances between the plurality of TVFs further comprises selecting the TVF based on a measured bitrate.

In one embodiment, selecting the TVF based on the measured bitrate comprises selecting a first TVF if the random bitrate is less than the measured bitrate, and selecting a second TVF if the random bitrate is larger than the measured bitrate.

In one embodiment, the measured bitrates in a first valid bitrate region is less than the measured bitrates in a second valid bitrate region.

In one embodiment, the method further comprises updating the one or more distances responsive to determining that the measured bitrates comprising the one or more valid bitrate regions has changed.

In one embodiment, the method further comprises not updating any valid or invalid bitrate region that is associated with excessively long TSs for each packet arrival.

In another embodiment, the method further comprises updating the valid or invalid bitrate region responsive to determining that a predefined time period has elapsed.

In one embodiment, the method further comprises updating the valid or invalid bitrate region responsive to determining that a predefined number of bits has been received since a last update.

In one embodiment, the method further comprises updating all of the valid and invalid bitrate regions offline.

In one embodiment, the resource being managed is bandwidth.

In one embodiment, the present disclosure also provides a network node configured to manage resources using per-packet marking. In this embodiment, the network node comprises communications circuitry and processing circuitry operatively connected to the communications circuitry. The communications circuitry configured to send data packets to, and receive data packets from, one or more other nodes via a communications network. The processing circuitry is configured to assign a plurality of throughput-value function (TVFs) to a plurality of timescales (TSs), with each TVF being assigned to a respective TS, and wherein each TS is associated with one or more valid bitrate regions, determine a plurality of measured bitrates based on the plurality of TSs, and determine a random bitrate. The processing circuitry is also configured to determine one or more distances between the plurality of TVFs, wherein each distance defines an invalid bitrate region between two TVFs, select a TVF based on the random bitrate and the one or more distances between the plurality of TVFs, and determine a packet value with which to mark a received data packet as a function of the selected TVF. With the packet value determined, the processing circuitry is further configured to mark the received data packet with the packet value, and output the data packet marked with the packet value via the communications circuitry.

In one embodiment, each TVF relates a plurality of packet values to bitrate throughput, and wherein both the packet values and the bitrate throughput are on a logarithmic scale.

In one embodiment, the processing circuitry is further configured to update the plurality of measured bitrates based on the plurality of TSs.

In one embodiment, the random bitrate is a randomly selected throughput value between 0 and a bitrate measured on a shortest TS.

In one embodiment, the processing circuitry is further configured to select a valid bitrate region from the one or more valid bitrate regions.

In one embodiment, the selected TVF is associated with the selected valid bitrate region.

In one embodiment, the processing circuitry is further configured to quantize the TVFs into a token bucket matrix, with each TVF being quantized into one or more token buckets, and with each token bucket corresponding to a different maximum number of tokens.

In one embodiment, to select a TVF based on the random bitrate and the one or more distances between the plurality of TVFs, the processing circuitry is further configured to select the TVF based on a measured bitrate.

In one embodiment, to select the TVF based on the measured bitrate, the processing circuitry is further configured to select a first TVF if the random bitrate is less than the measured bitrate, and select a second TVF if the random bitrate is larger than the measured bitrate.

In one embodiment, the measured bitrates in a first valid bitrate region is less than the measured bitrates in a second valid bitrate region.

In one embodiment, the processing circuitry is further configured to update the one or more distances responsive to determining that the measured bitrates comprising the one or more valid bitrate regions has changed.

In one embodiment, the processing circuitry is further configured to not update any valid or invalid bitrate region that is associated with excessively long TSs for each packet arrival.

In one embodiment, the processing circuitry is further configured to update the valid or invalid bitrate region responsive to determining that a predefined time period has elapsed.

In one embodiment, the processing circuitry is further configured to update the valid or invalid bitrate region responsive to determining that a predefined number of bits has been received since a last update.

In one embodiment, the processing circuitry is further configured to update all of the valid and invalid bitrate regions offline.

In one embodiment, the resource being managed is bandwidth.

In one embodiment, the present disclosure provides a non-transitory computer readable medium storing a control application. The control application comprises instructions that, when executed by processing circuitry of a network node configured to manage resources using per-packet marking, causes the network node to assign a plurality of throughput-value function (TVFs) to a plurality of timescales (TSs). Each TVF is assigned to a respective TS, and each TS is associated with one or more valid bitrate regions. The instructions, when executed by the processing circuitry, also cause the network node to determine a plurality of measured bitrates based on the plurality of TSs, determine a random bitrate, determine one or more distances between the plurality of TVFs, wherein each distance defines an invalid bitrate region between two TVFs, select a TVF based on the random bitrate and the one or more distances between the plurality of TVFs, determine a packet value with which to mark a received data packet as a function of the selected TVF, mark the received data packet with the packet value, and output the data packet marked with the packet value via the communications circuitry.

In one embodiment, the present disclosure provides a system for managing resources using per-packet marking. In this embodiment, the system comprises a network node configured to assign a plurality of throughput-value function (TVFs) to a plurality of timescales (TSs). Each TVF is assigned to a respective TS, and each TS is associated with one or more valid bitrate regions. The network node is also configured to determine a plurality of measured bitrates based on the plurality of TSs, and determine a random bitrate. The network node is also configured to determine one or more distances between the plurality of TVFs, wherein each distance defines an invalid bitrate region between two TVFs, select a TVF based on the random bitrate and the one or more distances between the plurality of TVFs, and determine a packet value with which to mark a received data packet as a function of the selected TVF. With the packet value determined, the network node is configured to mark the received data packet with the packet value, and output the data packet marked with the packet value via the communications circuitry.

DETAILED DESCRIPTION

Figure 1:
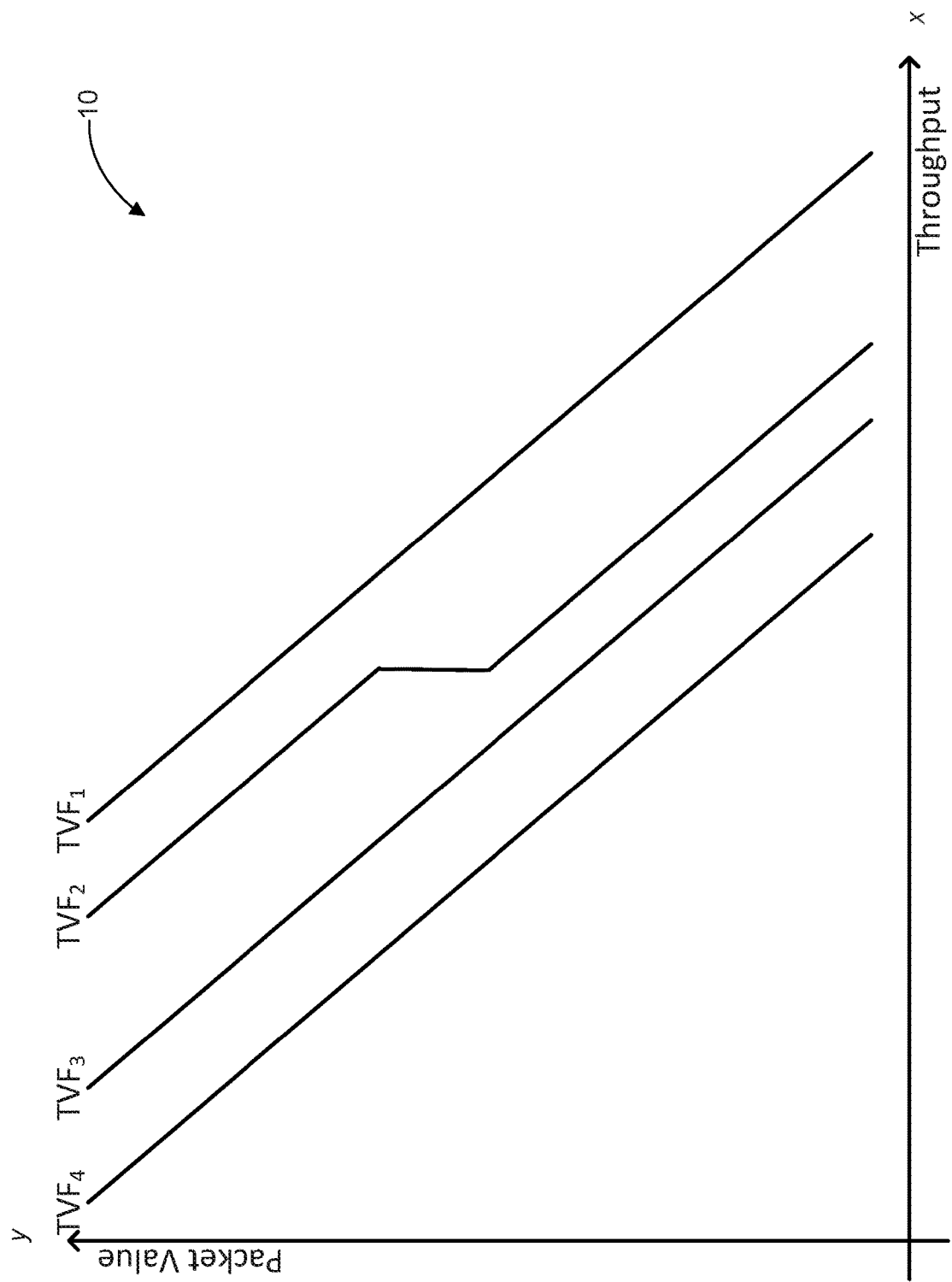
FIG. 1 illustrates a graph illustrating multiple TVFs assigned to a corresponding number of TSs.

Current methods of per-packet marking based bandwidth sharing control depend on the importance of the packets. Some methods define algorithms for a single buffer that result in a shared delay among flows, while other methods are based on bandwidth that is measured either on a short timescale or on a very long timescale. Still other methods utilize a plurality of token buckets. Each bucket represents a different timescale and is assigned to a same Drop Precedence level. Packets are marked in accordance with the assigned drop precedence level of all related buckets containing a predefined number of tokens.

However, current methods of per-packet marking based bandwidth sharing control methods are problematic. For example, methods that utilize token buckets are only suitable for use with a few drop precedence levels. It is not possible with such methods to achieve the same type of fine-grained control of resource sharing that is possible with other methods. Quantizing a TVF to utilize a plurality of token buckets is also not helpful. Particularly, an unrealistic number of token buckets will be required as the number of drop precedence levels increases (e.g., to more than 10). This makes packet marking inefficient, both in memory usage and in computational demand.

Embodiments of the present disclosure address these challenges by configuring a TVF for each of a plurality of TSs. More particularly, embodiments of the present disclosure efficiently measure the bitrates of incoming packets on all TSs. Each TVF is then graphed to indicate the throughput-packet value relationship for that TVF. Then, starting from the longest TS and moving towards the shortest TS, a distance is determined between the TVFs of different TSs at the measured bitrates. To determine the packet marking, a random throughput value between 0 and the bitrate measured on the shortest TS is selected. Then, depending on how the random throughput value relates to the measured bitrates, a TVF and the distances to add to the random throughput value are selected to determine the packet marking.

Additionally, embodiments of the present disclosure reuse the existing PPV core stateless schedulers in the core of the network, and provide an optimized implementation where bitrate measurement on longer timescales is not updated for each packet arrival.

As described herein, embodiments of the present disclosure provide benefits and advantages that current methods of per-packet marking based bandwidth sharing control are not able to provide. For example, not only do the embodiments described herein implement multi-timescale fairness, but they also provide a flexible way to control that multi-timescale fairness. Additionally, the embodiments described herein implement a fine-grained control of both traffic mix and resource bandwidth that is independent of other resource sharing control. Moreover, unlike prior art methods that define algorithms for a single buffer, implementing embodiments of the present disclosure requires no changes to the core of the network. This allows for fast implementation, while also minimizing any additional memory and computational requirements placed on the core of the network.

Referring now to the drawings, exemplary embodiments of the present disclosure build on the TVF concept to define resource sharing targets. FIG. 1, in particular, is a graph 10 illustrating an example for four TSs. As seen in FIG. 1, the embodiments of the present disclosure define one TVF per TS rather than a single TVF for all TSs. Both the x-axis (i.e., labeled "THROUGHPUT") and the y-axis (i.e., labeled "PACKET VALUE") are on logarithmic scale, and the TVFs are numbered from the shortest TS to the longest TS with $TVF_4$ indicating the longest TS and $TVF_1$ indicating the shortest TS. One of the goals of the present disclosure is to achieve higher bitrates for smaller bursts—i.e., $TVF_i(x) > TVF_{i+1}(x)$ for all i and x.

A given TVF can be quantized into token buckets. By way of example, the TVFs in FIG. 1 could be converted to a token bucket matrix. However, this conversion would mean that an extremely large number of token buckets would be required for implementation (e.g., 30000*4=12,000 token buckets). Not only is a large number of token buckets not practical to implement, as it would negatively impact the availability of both memory and computational resources, it is also highly inefficient. However, a token bucket model, such as the one illustrated in FIG. 2, for example, can be used to develop an efficient implementation.

Figure 2:
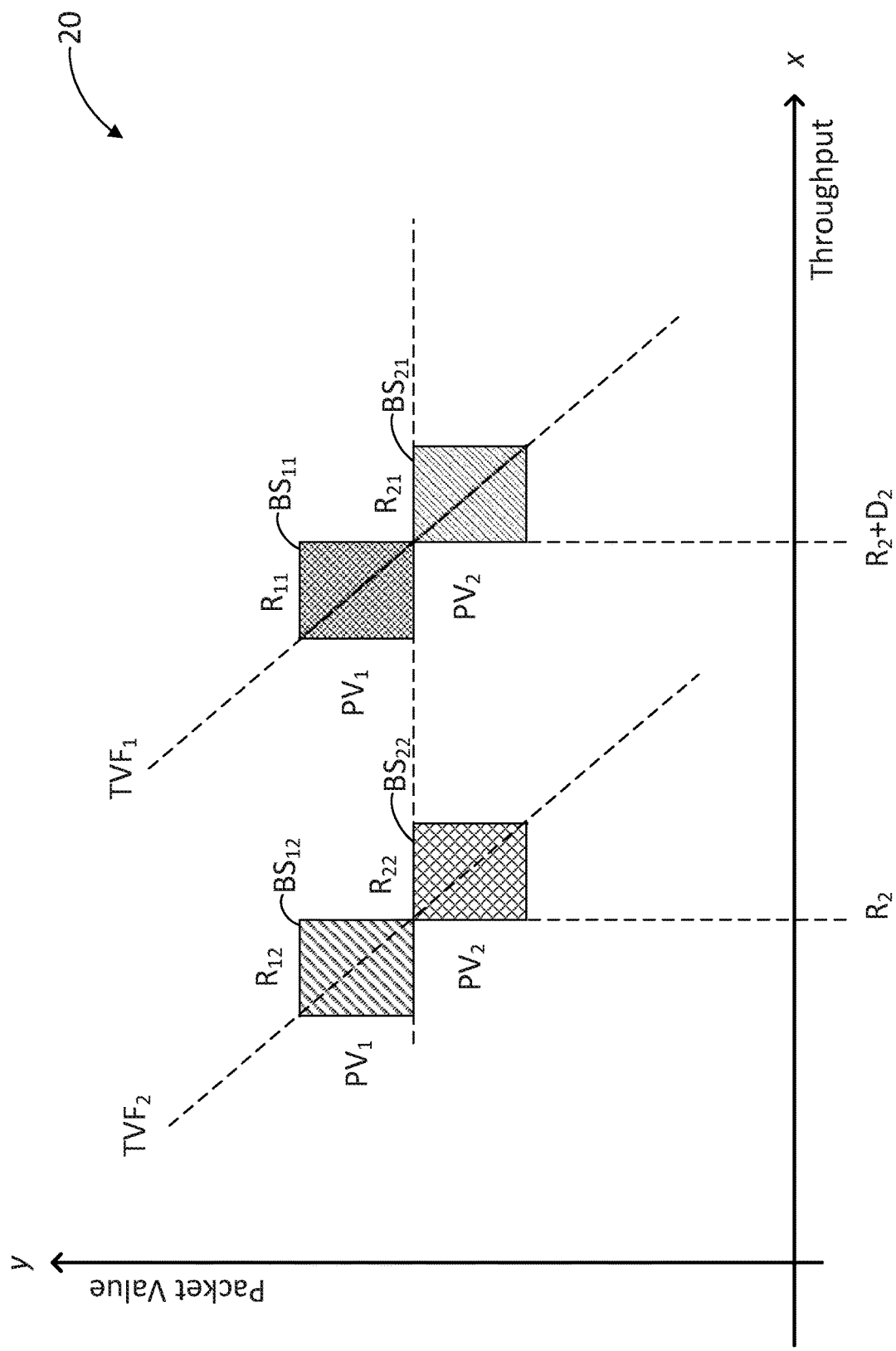
FIG. 2 is a graph illustrating a quantized TVF and a token bucket model.

In more detail, the embodiment of FIG. 2 is a graph 20 illustrating an example of a simple quantized TVF. Each TVF in FIG. 2—i.e., $TVF_1$, $TVF_2$—is quantized to two token buckets $BS_{11}$, $BS_{21}$ and $BS_{12}$, $BS_{22}$, respectively. This results in a 2×2 token bucket matrix.

According to the present disclosure, a packet can be marked to Packet Value (PV) $PV_1$ if both token buckets with bitrates $R_{12}$ and $R_{11}$ contain at least a predetermined number tokens. Thus:

$$R_{11} > R_{12}, \text{ and } R_{21} > R_{22}$$

This is because the TVFs are parallel on a logarithmic scale, and the equation $$TVF_i(x) > TVF_{i+1}(x)$$

holds true for all i and x. At the same time, the maximum token levels for the token buckets ($BS_{ij}$) are different, because of the timescales. Thus, with respect to the number of tokens in each token bucket $BS_{ij}$:

$$BS_{11} < BS_{12} \text{ and } BS_{21} < BS_{22}$$

Specifically, for a $PV_1$ for a given burst, $BS_{11}$ will first be emptied before $BS_{12}$. When $BS_{12}$ is also emptied, it means that bitrate $R_2$ on $TS_2$ (i.e., the timescale associated with $TVF_2$) has already been reached. Assuming, then, that $BS_{22}$ has not yet been emptied:

- $TVF_2$ will be representative when marking packets until bitrate $R_2$ is reached; and
- $TVF_1$ will be representative when marking packets when the bitrate is above $R_2$.

However, according to the present embodiments, the region between $R_2$ and $R_2+\Delta_2$ cannot be used. This means that if packet marking is performed:
- a packet is marked according to $TVF_2(r)$ if r is smaller than $R_2$; and
- a packet is marked according to $TVF_1(r+\Delta_2)$ if r is larger than $R_2$.

Figure 3:
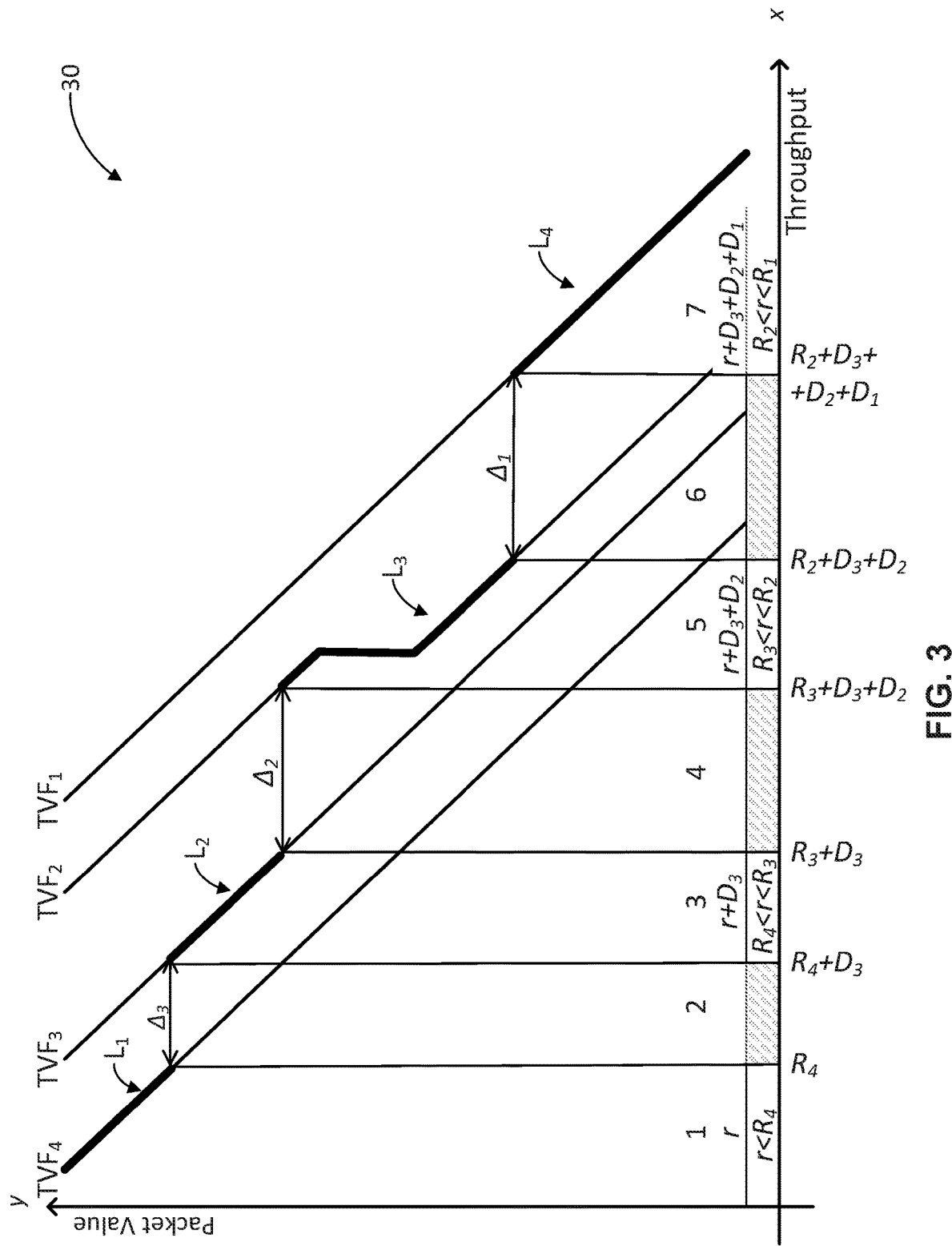
FIG. 3 is a graph illustrating the determination of a packet value for a multiple TVF profiler.

FIG. 3 is a graph illustrating the above concepts using generic rate measurement algorithms and using 4 TSs and 4 TVFs. As above, both the x-axis (i.e., "THROUGHPUT") and the y-axis ("PACKET VALUE") in FIG. 3 are logarithmic.

As seen in FIG. 3, each TVF—$TVF_1$, $TVF_2$, $TVF_3$, $TVF_4$, is associated with a different timescale. In particular, $TVF_1$ belongs to the shortest TS and $TVF_4$ belongs to the longest TS. The result of the rate measurements on the different timescales are denoted in FIG. 3 as $R_1$, $R_2$, $R_3$, and $R_4$.

It should be noted that while this specific example indicates that $R_1 > R_2 > R_3 > R_4$, this need not always be true. This is true, however, at the start of a burst. As seen in more detail later, the concept for the general case (i.e., the order of $R_i$) is similar. The behavior for both $TVF_4$ and $TVF_3$ is similar as described previously with respect to FIG. 2.

FIG. 3 is a graph 30 illustrating the distances $\Delta$ between the TVFs. Particularly, $\Delta_3$ denotes the distance between $TVF_4$ and $TVF_3$ at the intersection of $TVF_4$ and $R_4$. Note that $\Delta_3$ does depend on the value of $R_4$, because of the logarithmic scales. Region "2" is the region where $\Delta_3$ is and it is not used when determining a PV. Additionally, $\Delta_2$ and $\Delta_1$ can be similarly determined, with the only difference being that the intersection of $TVF_3$ and $R_3+\Delta_3$ determines $\Delta_2$, and the intersection of $TVF_2$ and $R_2+\Delta_3+\Delta_2$ determines $\Delta_1$. As seen in FIG. 3, all $\Delta$s (i.e., $\Delta_1$, $\Delta_2$, and $\Delta_3$) have a corresponding forbidden region (i.e., "invalid" regions 2, 4, 6).

According to the present embodiments, a PV for an incoming packet can be determined by:
- Updating all necessary Rs and $\Delta$s;
- Getting a random bitrate r, uniformly between 0 and $R_1$; and
- Based on the relation of r and the $R_i$s, selecting the right region (i.e., from regions 1,3,5,7 in FIG. 3) and the right TVF to determine the PV. By way of example only, if $R_3 < r < R_2$, then $TVF_2(r+\Delta_3+\Delta_2)$ determines the PV to use for packet marking.

The areas marked $L_1$-$L_4$ in FIG. 3 indicate the corresponding "valid" regions of TVFs that the present embodiments actually use to determine the packet value (PV).

Figure 4:
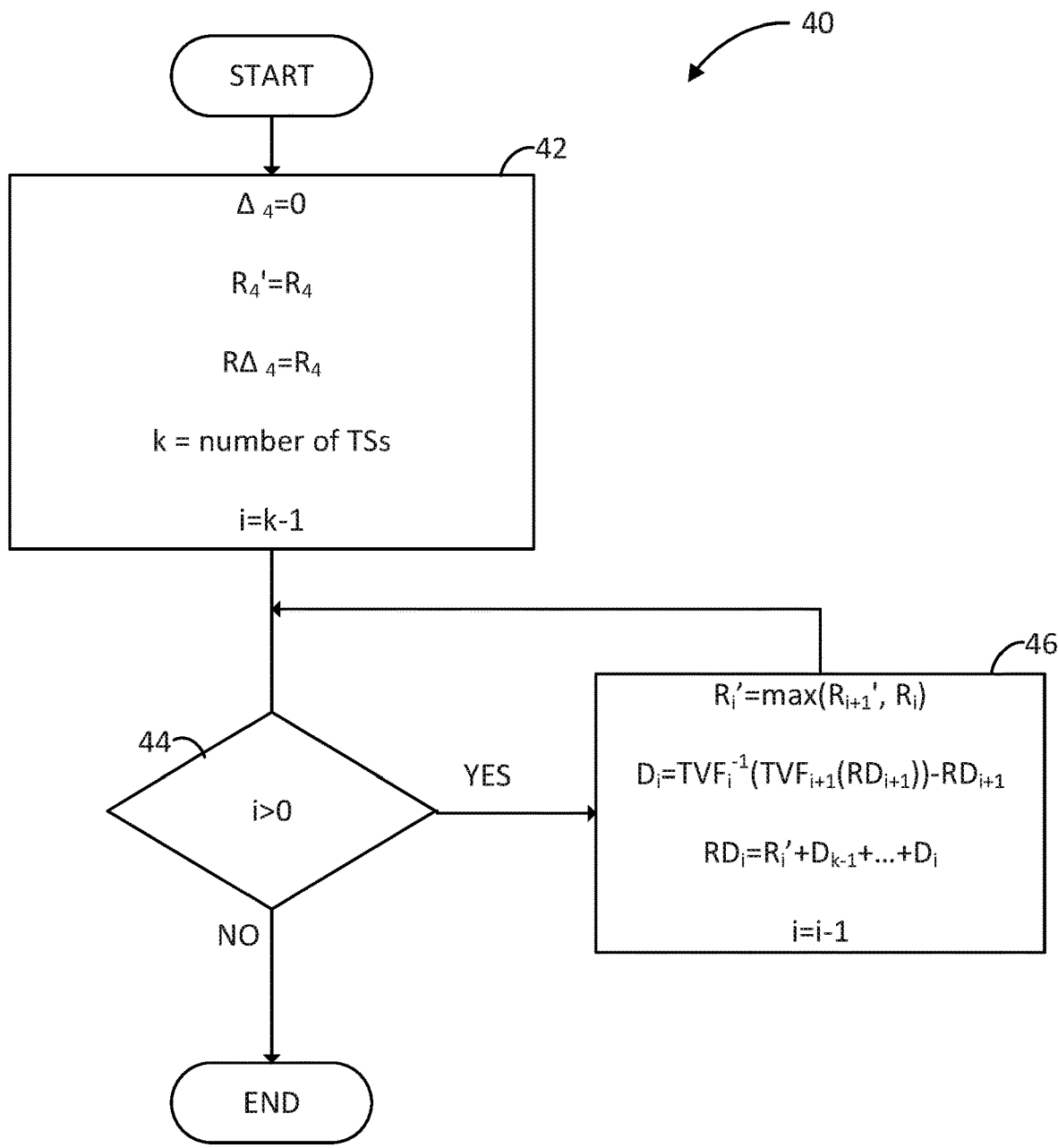
FIG. 4 is a flow diagram illustrating a method for computing Δs according to one embodiment of the present disclosure.

FIG. 4 is a flow diagram illustrating a method 40 for determining $\Delta_i$ for a general case according to one embodiment of the present disclosure. As seen in FIG. 4, method 40 begins with initializing the variables used in calculating $\Delta_i$ (box 42). Once initialization is complete, the value of i is checked (box 44). As long as i is greater than 0, method 40 computes $\Delta_i$ (box 46). Particularly:
- $R_i' = \max(R_{i+1}', R_i)$ is computed to handle the situation when $R_1 > R_2 > R_3 > R_4$ does not hold;
- $\Delta_i$ is calculated as $\Delta_i = TVF_i^{-1}(TVF_i + 1(R\Delta_{i+1})) - R\Delta_{i+1}$;
- $R\Delta_{i+1}$ is the reference value of $TVF_{i+1}$ to calculate a PV; and
- $TVF_{i-1}$ determines the throughput belonging to that PV on $TVF_i$.

According to the present embodiments, the $\Delta_i$s have to be updated only when the $R_i$s change.

In a further optimization, embodiments of the present disclosure do not update the $R_i$s that are associated with excessively long TSs for each packet arrival. Instead, these $R_i$s are updated only if $TS_i/10$ period have elapsed, or when $R_i*TS/10$ bits have arrived since the last update. When not all $R_i$s are updated, i can be initialized at the index of the longest updated TS (i.e. the "j" in $TS_{j-1}$). This optimizes the packet marker. In particular, as most timescales are likely to be above 1 second, the updates are likely to be infrequent. Additionally, to further optimize the performance of packet marking, embodiments of the present disclosure are configured to update of all $R_i$s in an offline control logic, rather than in the packet pipeline.

Figure 5:
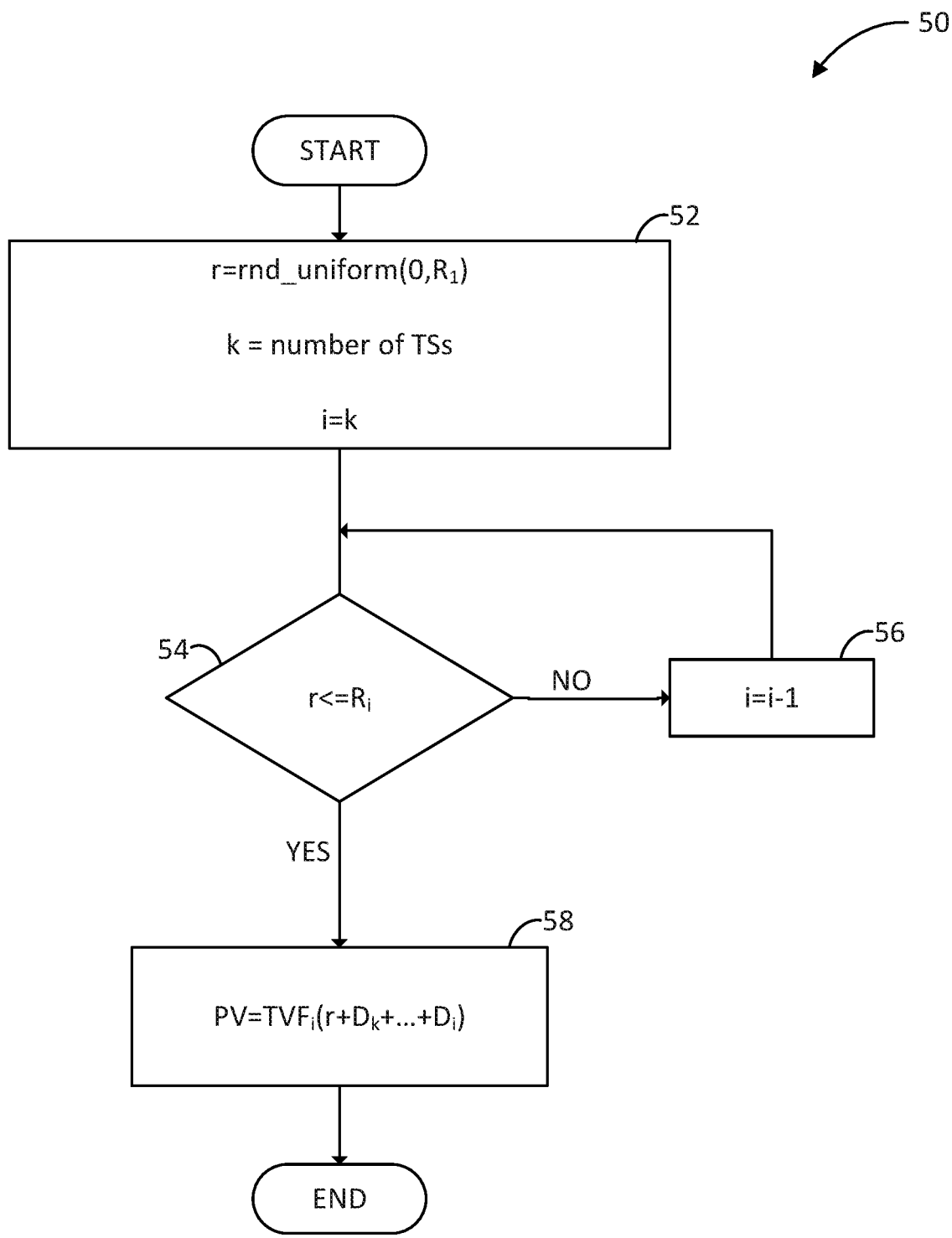
FIG. 5 is a flow diagram illustrating a method for computing a packet value according to one embodiment of the present disclosure.

FIG. 5 is a flow diagram illustrating a method 50 for determining a packet value based on the relation of the random rate r and the $R_i$s. As seen in FIG. 5, and using FIG. 3 as a further visual aid, method 50 selects a desired region, an appropriate right $\Delta$ offset, and a desired $TVF_i$.

In FIG. 5, method 50 begins by initializing some variables used in the computation (box 52). This initialization includes initializing the random rate r. Once the variables have been initialized, the random rate r value is checked to ensure that its value does not exceed that of $R_i$ (box 54). If not, the value of i is decremented (box 56) and the value of r re-checked (box 54). These steps continue in a loop until the value of r is determined to equal or exceed the value of $R_i$. Once the value of r equals or exceeds the value of $R_i$, the PV is computed as $TVF_i(r+\Delta_k+ \ldots +\Delta_i)$ (box 58).

Figure 6:
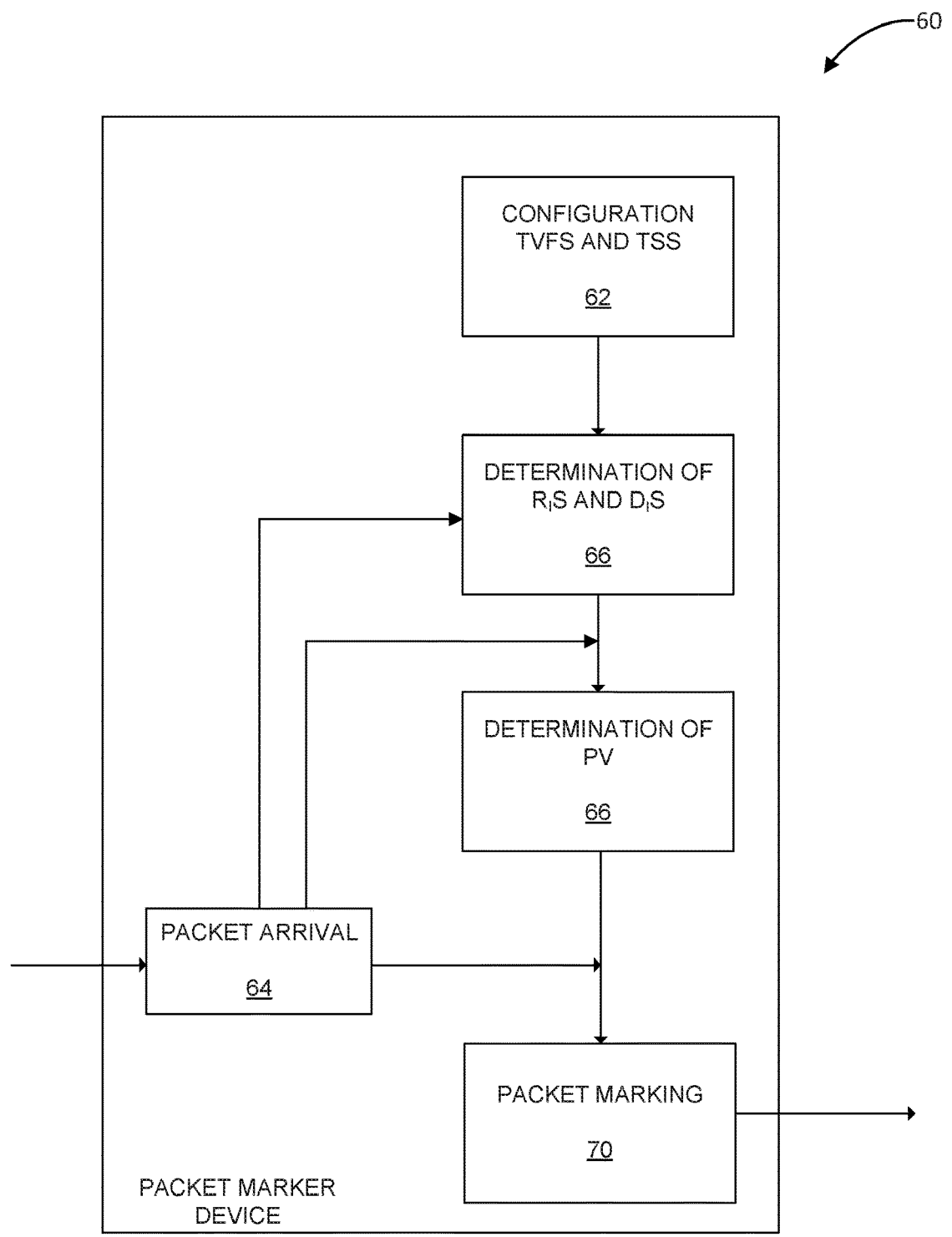
FIG. 6 is a functional block diagram illustrating functions implemented by a packet marking node to mark packets according to one embodiment of the present disclosure.

FIG. 6 illustrates the functions implemented at a packet marker device 60 according to an embodiment of the present disclosure. As seen in FIG. 6, the TVFs and the TSs are first configured (box 62). Then, upon arrival of a packet (box 64), the packet marker device 60 determines the $R_i$s and the $\Delta_i$s (box 66). In at least one embodiment, packet marker device 60 determines the $R_i$s and the $\Delta_i$s as previously described using method 40 seen in FIG. 4. Once the $R_i$s and the $\Delta_i$s have been determined, the packet marker device 60 computes the packet value for the incoming packet (box 68), as previously described in method 50 of FIG. 5, for example, and marks the packet with the determined packet value (box 70). The marked packet is then output by the packet marker device 60.

It should be noted that the present embodiments utilize bitrate measurement on different timescales. However, another embodiment of the present disclosure utilizes a sliding window based measurement. In these latter embodiments, the arrival of a packet during the last TS seconds is divided by the value of the TS. Further, the result of the disclosed configuration on the embodiment seen in FIG. 1 will be that $TVF_4$ determines the resource sharing of long flows. For shorter flows, the TVF corresponding to the TS closest to flow activity will represent resource sharing compared to other flows including long flows.

Figure 7A:
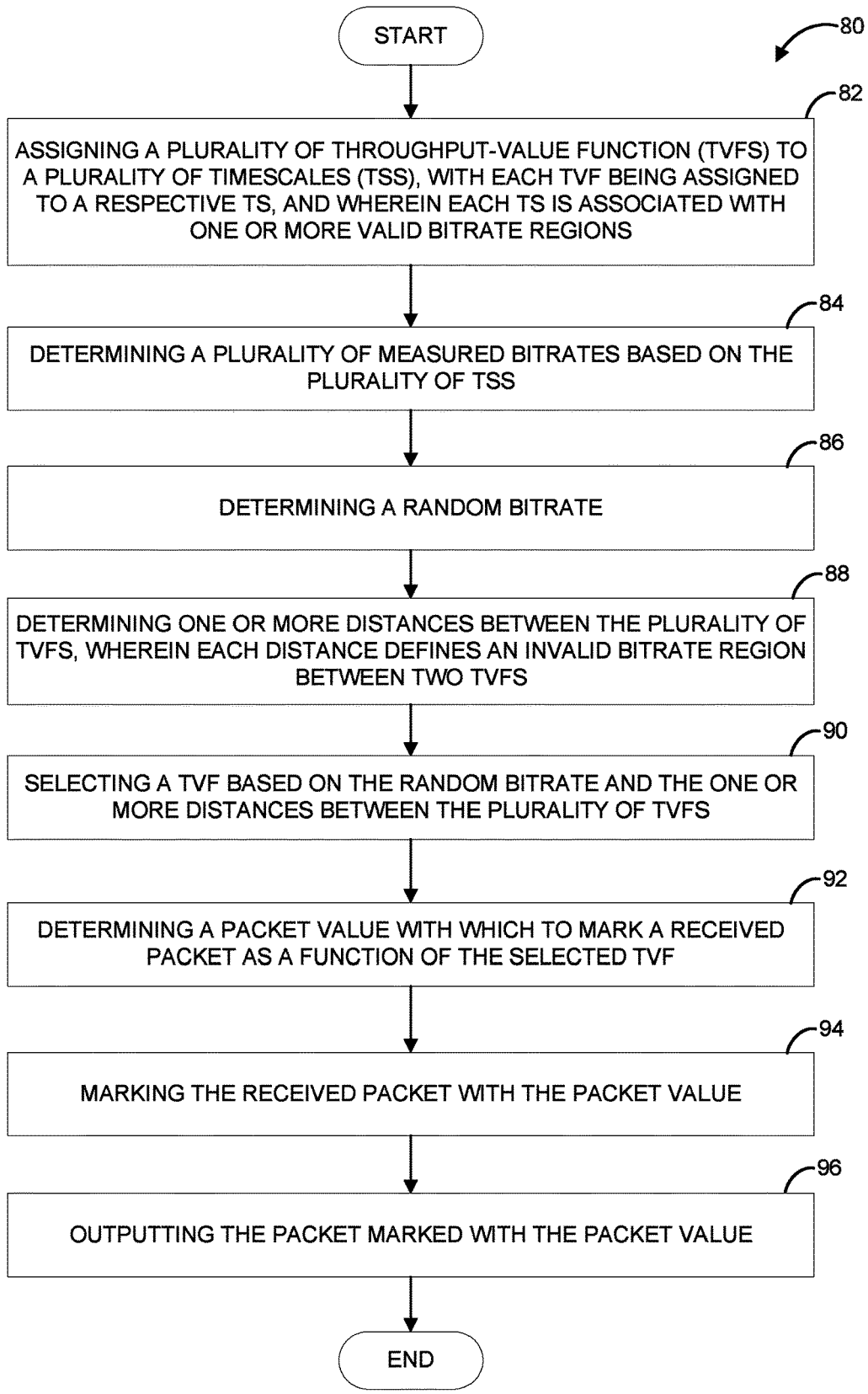
FIGS. 7A-7B are flow diagrams illustrating a method for managing shared resources using per-packet marking according to one embodiment of the present disclosure according to one embodiment of the present disclosure.
Figure 7B:
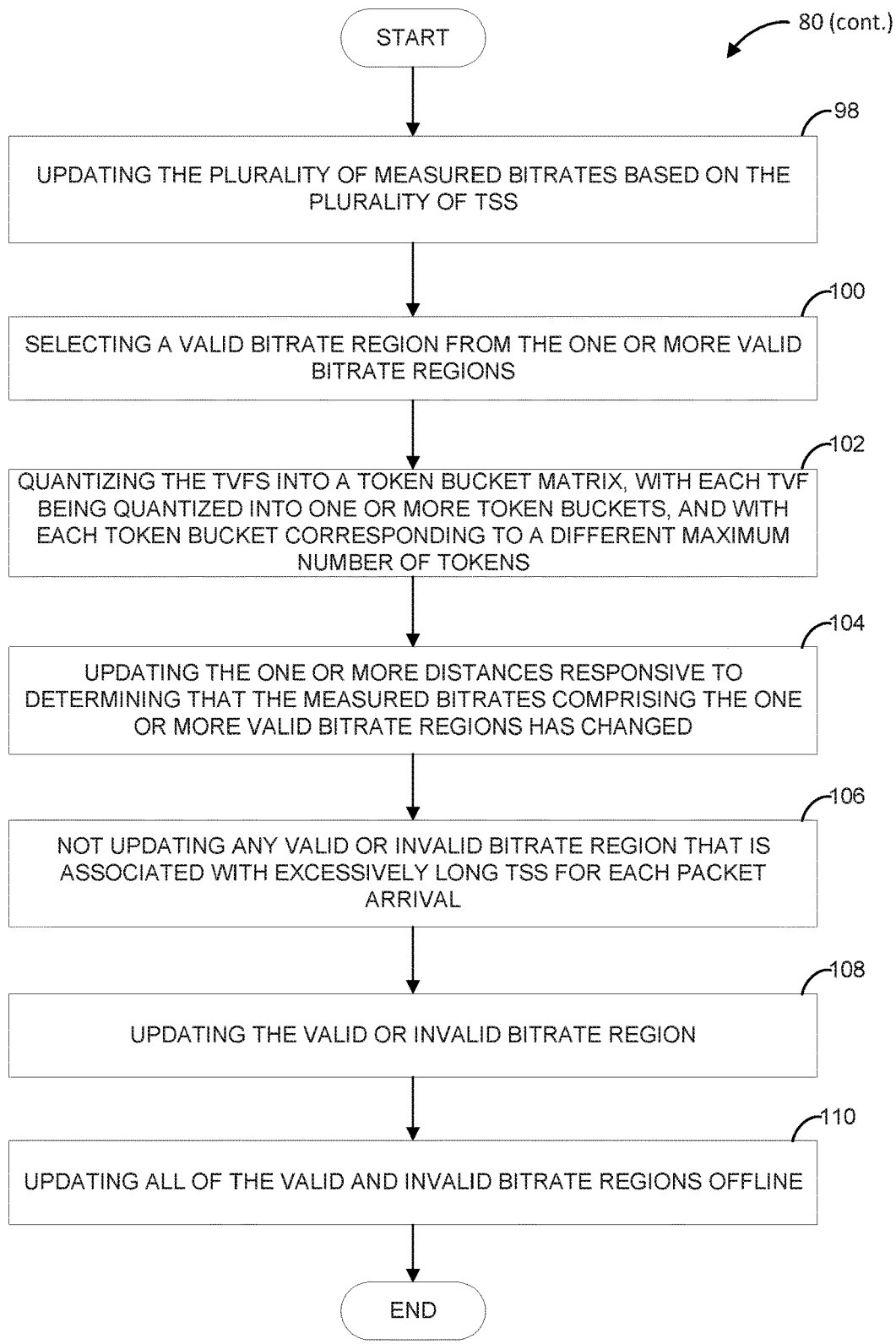

FIGS. 7A-7B are flow diagrams illustrating a method 80 for managing shared resources using per-packet marking according to one embodiment of the present disclosure. Method 80 is implemented by a packet marking device and, as seen in FIG. 7A, comprises assigning a plurality of TVFs to a plurality of TSs. Each TVF is assigned to a respective TS, and each TS is associated with one or more valid bitrate regions (box 82). Method 80 next calls for the packet marking device determining a plurality of measured bitrates based on the plurality of TSs (box 84), as well as a random bitrate (box 86). Method 80 then calls for the packet marking device determining one or more distances between the plurality of TVFs. In this embodiment, each distance defines an invalid bitrate region between two TVFs (box 88). Method 80 then calls for the packet marking device selecting a TVF based on the random bitrate and the one or more distances between the plurality of TVFs (box 90). In one embodiment, selecting a TVF based on the random bitrate and the one or more distances between the plurality of TVFs selecting the TVF based on a measured bitrate. Such selection may comprise, in one aspect, selecting a first TVF if the random bitrate is less than the measured bitrate, and selecting a second TVF if the random bitrate is larger than the measured bitrate. So selected, method 80 then calls for determining a packet value with which to mark a received packet as a function of the selected TVF (box 92). So determined, method 80 then calls for the packet marking device to mark the received packet with the packet value (box 94) and output the packet marked with the packet value (box 96).

Packet marking device also performs other functions in accordance with method 80. For example, as seen in FIG. 7B, method 80 calls for updating the plurality of measured bitrates based on the plurality of TSs (box 98). Method 80 also calls for the packet marking device to select a valid bitrate region from the one or more valid bitrate regions (box 100). The TVF that was selected previously (i.e., box 90 in FIG. 7A) is associated with the selected valid bitrate region. Method 80 then calls for quantizing the TVFs into a token bucket matrix (box 102). Particularly, in this embodiment, each TVF is quantized into one or more token buckets, with each token bucket corresponding to a different maximum number of tokens. Method 80 also calls for updating the one or more measured bitrates responsive to determining that the measured bitrates comprising the one or more valid bitrate regions has changed (box 104), and determining whether or not to update a given bitrate region (boxes 106, 108). Particularly, method 80 calls for not updating any valid or invalid bitrate region that is associated with excessively long TSs for each packet arrival (box 106). However, responsive to determining that a predefined time period has elapsed, or that a predefined number of bits has been received since a last update, a valid or invalid bitrate region is updated (box 108). In one embodiment, method 80 calls for updating all of the valid and invalid bitrate regions offline (box 110).

Figure 8:
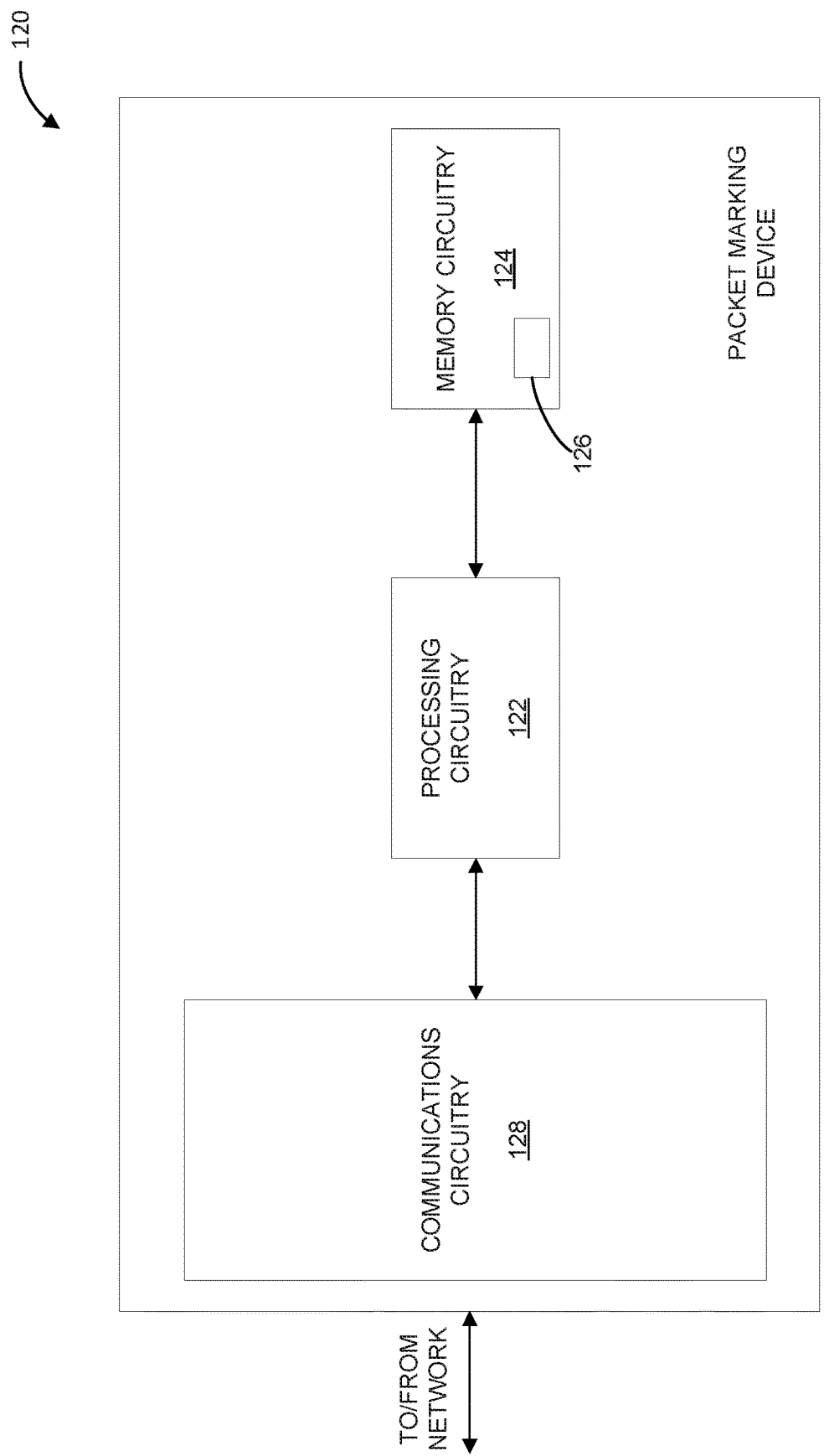
FIG. 8 is a schematic diagram illustrating a packet marker node configured according to an embodiment of the present disclosure.

FIG. 8 is a schematic diagram illustrating an exemplary packet marking device 120 configured according to embodiments of the present disclosure. As seen in FIG. 8, packet marking device 120 comprises processing circuitry 122, memory circuitry 124 configured to store a control program 126, and communications circuitry 128. The processing circuitry 122 may comprise one or more microprocessors, microcontrollers, hardware circuits, firmware, or a combination thereof, and controls the operation of the packet marking device 120 as herein described. Memory circuitry 124 stores program instructions and data needed by the processing circuitry 122 to implement the present embodiments herein described. Permanent data and program instructions executed by the processing circuitry 122, such as control program 126, for example, may be stored in a non-volatile memory, such as a read only memory (ROM), electronically erasable programmable read only memory (EEPROM), flash memory, or other non-volatile memory device. A volatile memory, such as a random access memory (RAM), may be provided for storing temporary data. The memory circuitry 124 may comprise one or more discrete memory devices, or may be integrated with the processing circuitry 122. The communications interface circuitry 128 is configured to send messages to, and receive messages from, one or more other nodes in a communications network. Such communications include incoming packets to be marked according to the present embodiments, as well as the outgoing packets that have been marked according to the present embodiments.

Figure 9:
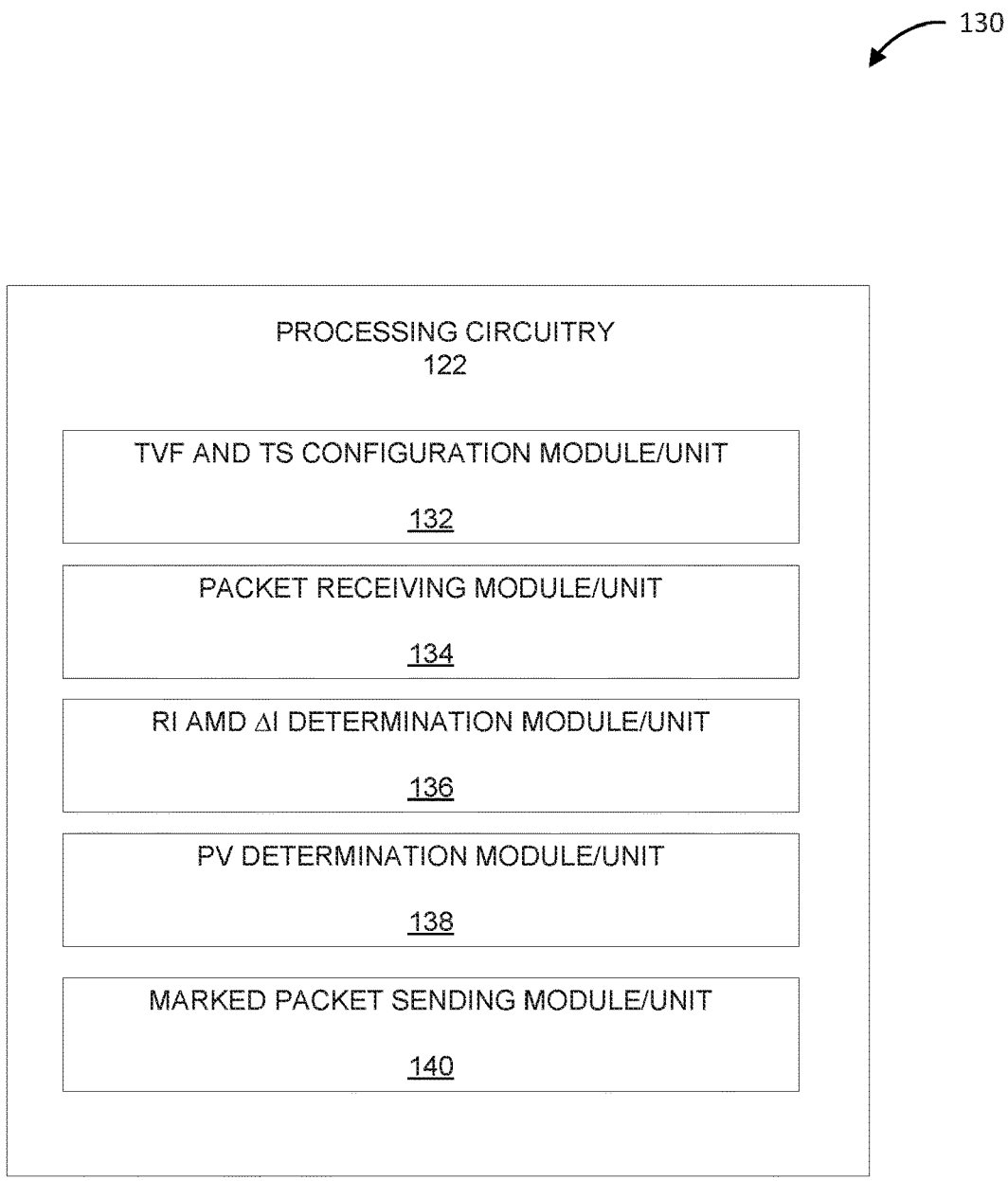
FIG. 9 illustrates a computer program product comprising code executed by the processing circuitry of a packet marker node to mark incoming packets according to one embodiment of the present disclosure.

FIG. 9 illustrates the main functional components of an exemplary processing circuitry 122 for a packet marking device 120. In particular, as seen in FIG. 9, processing circuitry 122 comprises a TVF and TS configuration module/unit 132, an a packet receiving module/unit 134, an $R_i$ and $\Delta_i$ determination module/unit 136, a PV determination module/unit 138, and a marked packet sending module/unit 140. Those of ordinary skill in the art should readily appreciate that the TVF and TS configuration module/unit 132, the packet receiving module/unit 134, the $R_i$ and $\Delta_i$ determination module/unit 136, the PV determination module/unit 138, and the marked packet sending module/unit 140 may, according to the present embodiments, be implemented by one or more microprocessors, microcontrollers, hardware, firmware, or a combination thereof.

In operation, the TVF and TS configuration module/unit 132 is configured to determine the TVFs and the TSs, and to assign a TVF to each of the plurality of TSs, as previously described. The packet receiving module/unit 134 is configured receive incoming packets that are to be marked according to embodiments of the present disclosure, while the $R_i$ and $\Delta_i$ determination module/unit 136 is configured to compute the $R_i$s and $\Delta_i$s, and select the desired $\Delta_i$, as previously described. The PV determination module/unit 138 is configured to select a desired TVF to compute the PV that will be utilized to mark the incoming packet, as previously described. The marked packet sending module/unit 140 is configured to send the marked packet to a destination node, as previously described.

Embodiments further include a carrier containing a computer program, such as control program 126. This carrier may comprise one of an electronic signal, optical signal, radio signal, or computer readable storage medium.

In this regard, embodiments herein also include a computer program product (e.g., control program 126) stored on a non-transitory computer readable (storage or recording) medium (e.g., memory circuitry 124) and comprising instructions that, when executed by a processor of an apparatus, cause the apparatus (e.g., a packet marking device 120) to perform as described above. Such a computer program product may be, for example, control program 126.

Embodiments further include a computer program product, such as control program 84, comprising program code portions for performing the steps of any of the embodiments herein when the computer program product is executed by a computing device, such as packet marking device 120. This computer program product may be stored on a computer readable recording medium.

Additionally, the packet marker configured according to the present embodiments is per traffic aggregate and no coordination between separate entities is required. Therefore a packet marking device configured in accordance with the present embodiments can be implemented in cloud.

The present disclosure configures a packet marking node to implement function not implemented in prior art devices. For example, a packet marking node configured according to the present embodiments can control resource sharing continuously based on throughput fairness on several timescales. Additionally, multiple TVFs are configured to represent resource sharing on multiple time-scales. The TVFs are configured based on a relation between the TVFs. Additionally, the present embodiments measure bitrates on multiple time-scales in the profiler, and determine the Δ values and the valid regions of TVFs based on that information. The present embodiments also determine where the Δs are positioned based on the distance between TVFs at selected bitrates, as well as the packet value based on random bitrate. As previously described, the random bitrate is between zero and the rate measurement on the shortest time-scale. The present embodiments also configure a packet marking node to select the right TVF and the right Δs to add to the random bitrate r, and further, provide solutions for optimizing rate measurements.

What is claimed is:

1. A method of managing shared resources using per-packet marking, the method comprising:
   assigning a plurality of throughput-value function (TVFs) to a plurality of timescales (TSs), with each TVF being assigned to a respective TS, and wherein each TS is associated with one or more valid bitrate regions;
   determining a plurality of measured bitrates based on the plurality of TSs;
   determining a random bitrate;
   determining one or more distances between the plurality of TVFs, wherein each distance defines an invalid bitrate region between two TVFs;
   selecting a TVF based on the random bitrate and the one or more distances between the plurality of TVFs;
   determining a packet value with which to mark a received packet as a function of the selected TVF;
   marking the received packet with the packet value; and
   outputting the packet marked with the packet value.

2. The method of claim 1 wherein each TVF relates a plurality of packet values to bitrate throughput, and wherein both the packet values and the bitrate throughput are on a logarithmic scale.

3. The method of claim 1 further comprising updating the plurality of measured bitrates based on the plurality of TSs.

4. The method of claim 1 wherein the random bitrate is a randomly selected throughput value between 0 and a bitrate measured on a shortest TS.

5. The method of claim 1 further comprising selecting a valid bitrate region from the one or more valid bitrate regions, and wherein the selected TVF is associated with the selected valid bitrate region.

6. The method of claim 1 further comprising quantizing the TVFs into a token bucket matrix, with each TVF being quantized into one or more token buckets, and with each token bucket corresponding to a different maximum number of tokens.

7. The method of claim 6 wherein selecting a TVF based on the random bitrate and the one or more distances between the plurality of TVFs further comprises selecting the TVF based on a measured bitrate by:
   selecting a first TVF if the random bitrate is less than the measured bitrate; and
   selecting a second TVF if the random bitrate is larger than the measured bitrate.

8. The method of claim 1 wherein the measured bitrates in a first valid bitrate region is less than the measured bitrates in a second valid bitrate region.

9. The method of claim 1 further comprising updating the one or more distances responsive to determining that the measured bitrates comprising the one or more valid bitrate regions have changed.

10. The method of claim 1 further comprising:
    not updating any valid or invalid bitrate region that is associated with excessively long TSs for each packet arrival; and
    updating the valid or invalid bitrate region responsive to determining that:
    a predefined time period has elapsed; or
    a predefined number of bits has been received since a last update.

11. A network node configured to manage resources using per-packet marking, the node comprising:
    communications circuitry configured to send data packets to, and receive data packets from, one or more other nodes via a communications network; and
    processing circuitry operatively connected to the communications circuitry and configured to:
    assign a plurality of throughput-value function (TVFs) to a plurality of timescales (TSs), with each TVF being assigned to a respective TS, and wherein each TS is associated with one or more valid bitrate regions;
    determine a plurality of measured bitrates based on the plurality of TSs;
    determine a random bitrate;
    determine one or more distances between the plurality of TVFs, wherein each distance defines an invalid bitrate region between two TVFs;
    select a TVF based on the random bitrate and the one or more distances between the plurality of TVFs;
    determine a packet value with which to mark a received data packet as a function of the selected TVF;

mark the received data packet with the packet value; and output the data packet marked with the packet value via the communications circuitry.

12. The network node of claim 11 wherein each TVF relates a plurality of packet values to bitrate throughput, wherein both the packet values and the bitrate throughput are on a logarithmic scale, and wherein the processing circuitry is further configured to update the plurality of measured bitrates based on the plurality of TSs.

13. The network node of claim 11 wherein the random bitrate is a randomly selected throughput value between 0 and a bitrate measured on a shortest TS.

14. The network node of claim 11 wherein the processing circuitry is further configured to select a valid bitrate region from the one or more valid bitrate regions, and wherein the selected TVF is associated with the selected valid bitrate region.

15. The network node of claim 11 wherein the processing circuitry is further configured to quantize the TVFs into a token bucket matrix, with each TVF being quantized into one or more token buckets, and with each token bucket corresponding to a different maximum number of tokens.

16. The network node of claim 15 wherein to select a TVF based on the random bitrate and the one or more distances between the plurality of TVFs, the processing circuitry is further configured to select the TVF based on a measured bitrate by:

selecting a first TVF if the random bitrate is less than the measured bitrate; and selecting a second TVF if the random bitrate is larger than the measured bitrate.

17. The network node of claim 11 wherein the measured bitrates in a first valid bitrate region are less than the measured bitrates in a second valid bitrate region.

18. The network node of claim 11 wherein the processing circuitry is further configured to update the one or more distances responsive to determining that the measured bitrates comprising the one or more valid bitrate regions has changed.

19. The network node of claim 11 wherein the processing circuitry is further configured to:

not update any valid or invalid bitrate region that is associated with excessively long TSs for each packet arrival; and update the valid or invalid bitrate region responsive to determining that"

a predefined time period has elapsed; or a predefined number of bits has been received since a last update.

20. A non-transitory computer readable medium storing a control application thereon, the control application comprising instructions that, when executed by processing circuitry of a network node configured to manage resources using per-packet marking, causes the network node to:

assign a plurality of throughput-value function (TVFs) to a plurality of timescales (TSs), with each TVF being assigned to a respective TS, and wherein each TS is associated with one or more valid bitrate regions;

determine a plurality of measured bitrates based on the plurality of TSs;

determine a random bitrate;

determine one or more distances between the plurality of TVFs, wherein each distance defines an invalid bitrate region between two TVFs;

select a TVF based on the random bitrate and the one or more distances between the plurality of TVFs;

determine a packet value with which to mark a received data packet as a function of the selected TVF;

mark the received data packet with the packet value; and output the data packet marked with the packet value via the communications circuitry.

\* \* \* \* \*